United States Patent [19]

Stotler

[11] Patent Number: 5,000,788
[45] Date of Patent: Mar. 19, 1991

[54] METHOD FOR PREPARING STARCH BASED CORRUGATING ADHESIVES USING WASTE WASH WATER

[75] Inventor: William D. Stotler, Watsontown, Pa.

[73] Assignee: Sprout-Bauer, Inc., Muncy, Pa.

[21] Appl. No.: 507,822

[22] Filed: Apr. 12, 1990

[51] Int. Cl.$^5$ ............................................... C09D 4/00
[52] U.S. Cl. .................................... 106/213; 106/214
[58] Field of Search ....................... 106/210, 213, 214

[56] References Cited

U.S. PATENT DOCUMENTS 3,970,467   7/1976   Voight et al. .................... 106/213

Primary Examiner—William R. Dixon, Jr.
Assistant Examiner—David M. Brunsman
Attorney, Agent, or Firm—Richard H. Berneike; William W. Habelt

[57] ABSTRACT

A starch based adhesive for use in manufacturing corrugated paper and board is prepared in a single preparation tank 20 by admixing, under high shear vortex mixing, a first portion of aqueous medium, a first starch portion, an aqueous sodium hydroxide, a borating additive, a second portion of aqueous medium and a second starch portion to produce a finished starch adhesive. At least one of the first and second portions of aqueous medium comprises a mixture of fresh water and recycled wash water selected from the group consisting essentially of untreated flexographic printing press wash water, untreated corrugator wash water, and mixtures thereof.

9 Claims, 2 Drawing Sheets

METHOD FOR PREPARING STARCH BASED CORRUGATING ADHESIVES USING WASTE WASH WATER

BACKGROUND OF THE INVENTION

The present invention relates to the preparation of starch based corrugating adhesives and, more particularly, to the preparation of starch based corrugating adhesives using as the aqueous medium for the adhesive a mixture of fresh water and recycled unfiltered wash water from the corrugator press and/or the flexographic printing press wash processes.

In the corrugated paperboard industry, corrugator presses are used to glue together sheets of paper with starch based adhesives to form paperboard products. Flexographic printing presses are extensively used to print various information on the paperboard products. Both these corrugator presses and these flexographic printing presses must be periodically cleaned by flushing with large quantities of water. The waste wash water from the cleaning of the corrugator presses contains unused starch adhesive, machine oils and paper lint. Similarly, the waste wash water from the cleaning of the flexographic printing presses contains contaminants such as ink solids, detergents, machine oils and paper lint. Ideally, the waste wash water from the corrugator presses and the flexographic printing presses should be recycled for use elsewhere in the plant rather than merely being discarded. A preferred use for this waste wash water would be as part of the aqueous medium used in preparing the starch adhesives for the corrugating process. Unfortunately, the presence of contaminants, particularly ink solids and ammonium ions in the flexographic printing press waste wash water, have prevented use of this waste wash water in the preparation of the starch based adhesives without prior treatment to remove these contaminants.

The conventional two-phase process for preparing corrugating adhesives, as well as various modifications thereof, is described in detail in a 1977 TAPPI monograph entitled "Preparation of Corrugating Adhesives". In the typical two-phase process described therein, the starch based adhesive is prepared in two separate portions, i.e., a cooked starch portion referred to as the "carrier starch" and an uncooked portion referred to as the "raw starch".

Typically, the carrier starch is prepared in a first tank by adding a first amount of fresh water along with a desired amount of a first starch, typically a corn starch either in raw or modified form, and the mixture agitated to form a starch slurry. Caustic soda, normally as a 50% sodium hydroxide solution, is then admixed into this starch slurry to chemically cook the starch thereby producing the carrier starch portion.

In a second tank, the raw starch portion is prepared by adding a second amount of fresh water along with a desired amount of a second starch, typically an unmodified, i.e., raw, corn starch, and agitated to form a raw starch slurry to which a borating compound, typically in the form of boric acid or borax, is also added. After the raw starch portion has been thoroughly mixed, the prepared cooked starch portion is added thereto and thoroughly mixed therewith to yield the product starch adhesive typically having a starch solids content of about 17 to about 25 percent by weight and a viscosity in the range of about 150 to about 250 centipoises.

This finished starch adhesive is passed to a relatively small, typically 100-150 gallons capacity, storage tank from where it is circulated to the corrugator on demand. Because the finished starch adhesive is quite susceptible to thickening or thinning and viscosity breakdown, the supply of finished starch adhesive is deliberately held at low levels and fresh starch adhesive is almost constantly being generated and used before it breaks down. Further, it is customary to keep the finished starch adhesive in circulation and to maintain the finished starch adhesive at a constant temperature of about 100° F. to about 105° F. (about 37.5° C. to 40.5° C.) to forestall thickening or thinning.

As noted previously, conventional practice is to use fresh water only as the aqueous medium in preparing starch adhesives even though the desirability of disposing of waste wash water by using it in the starch adhesive preparation has long been recognized. One proposal for using flexographic printing press waste wash water is presented in U.S. Pat. No. 3,970,467. As disclosed therein waste wash water from the flexographic press is treated to remove ink solids and ammonium ions from the flexographic press waste wash water and then pass the ammonium ion free water to the starch adhesive preparation tanks. It is stated in U.S. Pat. No. 3,970,467, that when untreated flexographic press waste wash water was used as a replacement for fresh water in preparing the cooked (primary or carrier) starch portion of the adhesive formulation, aggregates of coalesced starch were formed which resulted in an unworkable adhesive. It is further stated in U.S. Pat. No. 3,970,467, that even when untreated flexographic press waste wash water was used as a replacement for fresh water only in preparing the uncooked (secondary) starch portion, the resultant adhesive formulation exhibited unacceptably higher viscosities and gel points than adhesive formulations produced with fresh water or treated flexographic press waste wash water. Unfortunately, the additional process step necessary to appropriately treat the flexographic press waste wash water add further complication and cost to the adhesive preparation process.

SUMMARY OF INVENTION

It is an object of the present invention to provide a method for preparing starch based corrugating adhesive wherein waste wash water is used as part of the aqueous medium for preparing the adhesives.

In the method of the present invention, a starch based adhesive suitable for use in manufacturing corrugated paper and board is prepared by admixing a first portion of aqueous medium, a first starch portion, an aqueous sodium hydroxide solution, a borating additive, a second portion of aqueous medium and a second starch portion to produce a finished starch adhesive. Advantageously, in the method of the present invention, at least one of the first and second portions of aqueous medium comprises a mixture of fresh water and recycled wash water selected from the group consisting essentially of untreated flexographic printing press wash water, untreated corrugator wash water, and mixtures thereof.

Most advantageously, the starch based adhesive is prepared via the method of the present invention in a single preparation tank equipped with a high shear vortex mixer in the following manner. To initiate the process, a first portion of the aqueous medium is introduced into the tank and then a first portion of starch is introduced into the tank. Next, an aqueous solution of sodium hydroxide is metered into the tank and the mixer activated to thoroughly admix the starch and sodium hydroxide and chemically cook the starch thereby producing a cooked starch liquor. A borating additive, preferably borax or boric acid, is next added to the cooked starch liquor to stable viscosity. A second portion of aqueous medium is then added to the cooked starch liquor to dilute its solids content prior to adding a second portion of starch to the diluted cooked starch liquor. After sufficient mixing under the action of the high shear vortex mixer, the liquor is drained from the preparation tank to a collection tank as the finished starch adhesive product ready for use on the corrugator.

DETAILED DESCRIPTION OF A PREFERRED EMBODIMENT

Figure 1:
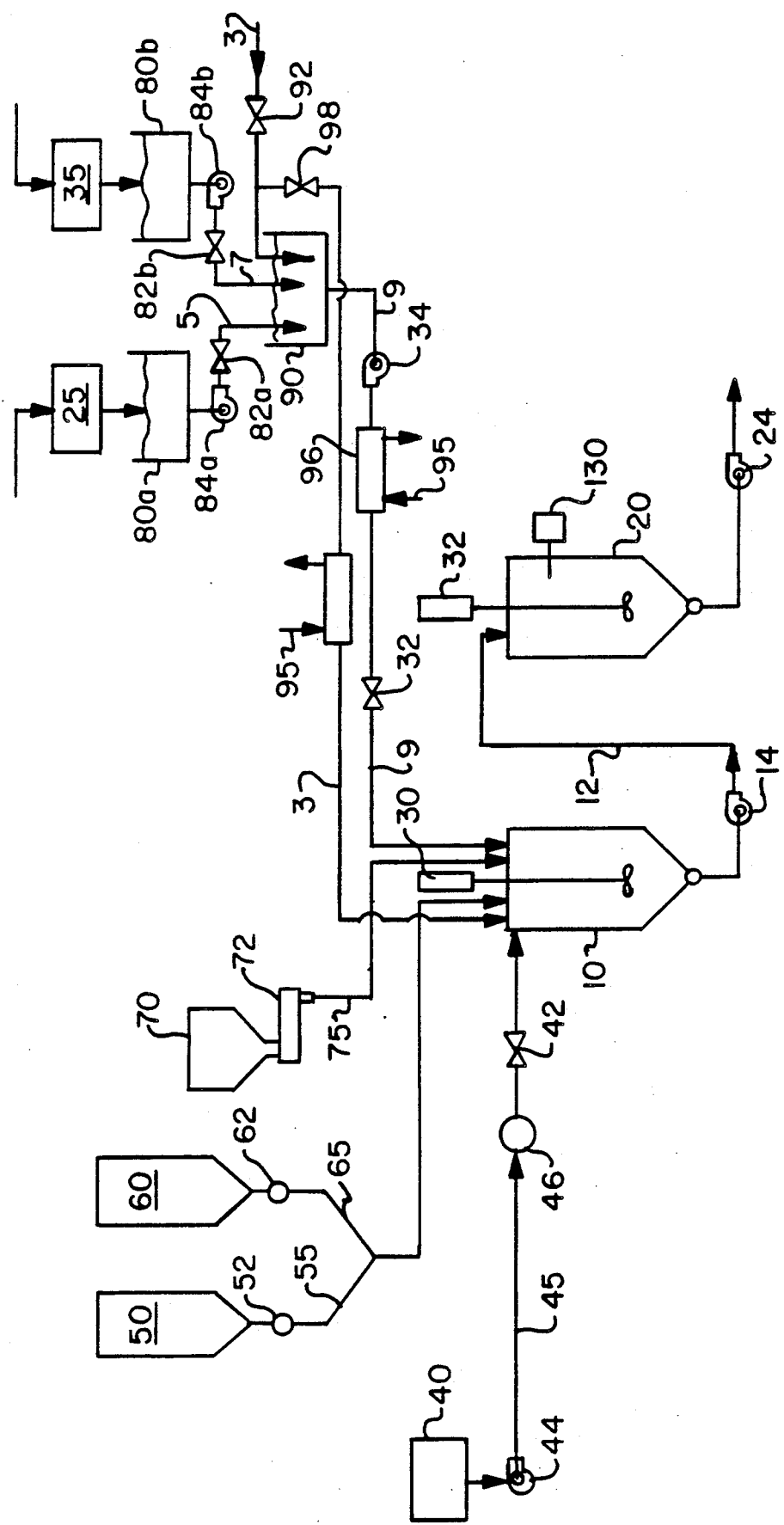
FIG. 1 of the drawing comprises a schematic diagram illustrating the method of the present invention.
Figure 2:
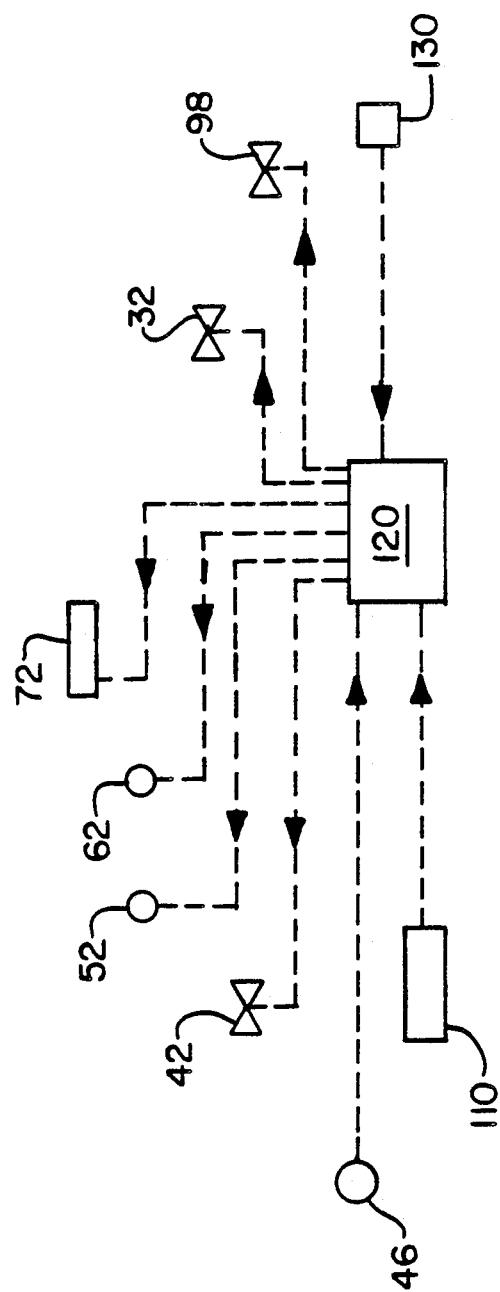
FIG. 2 of the drawing comprises a schematic control diagram illustrating preferred method of controlling the process of the present invention.

Referring now to the drawing, there is schematically depicted therein a system for preparing starch based adhesives suitable for use in producing corrugated paper products. In the process of the present invention, a first portion of an aqueous medium, a first starch portion, an aqueous sodium hydroxide solution, a borating additive, a second portion of an aqueous and a second starch portion are admixed in a single preparation tank 10 to produce a finished starch adhesive which is transferred through line 12 via pump 14 to a companion holding tank 20 for brief storage, typically for no more than 30-45 minutes, therein. The finished starch adhesive is pumped on demand from holding tank 20 via pump 24 to a corrugator press 35 so as to provide a continuous supply of adhesive for combining paper elements to form the corrugated product.

In a typical system for carrying out the present invention, the preparation tank 10 has a 150 gallon capacity and its companion holding tank 20 has a 200 gallon capacity. To facilitate accurate weighing of the ingredients comprising the adhesive formulation, the preparation tank 10 is advantageously suspended on electronic load cells (not shown). Additionally, the preparation tank 10 is equipped with a high shear vortex mixing means 30 for efficiently admixing the various ingredients comprising the adhesive formulation. The storage tank 20, if desired, may also be equipped with a mixing means 32 for maintaining the finished starch adhesive in circulation during storage.

In the preferred embodiment of the method of the present invention, the cooked portion of adhesive is formed first in the preparation tank 10 by slurrying a first portion of starch in a first portion of the aqueous medium and then admixing therewith an aqueous solution of sodium hydroxide under the high shear vortex mixing action generated by the mixing means 30. Borating additive, most advantageously borax or boric acid in a dry powder form, is admixed with the cooked carrier starch to stabilize the viscosity of the cooked carrier starch at its lowest or base viscosity which corresponds to a thorough dispersion of the starch and complete disruption of the starch granules. At this point, a second portion of aqueous medium is introduced into the preparation tank 10 and admixed with the cooked-carrier starch under the high shear vortex mixing action generated by the mixing means 30. This additional aqueous medium serves to dilute the cooked carrier starch and bring its viscosity down to a low level prior to adding a second portion of starch, typically raw, that is unmodified starch, to the cooked carrier starch as the final ingredient of the adhesive formulation. After sufficient mixing, the finished adhesive formulation is transferred to the holding tank 20.

Unlike prior art processes, the process of the present invention makes use of waste wash water from the wash-up of the corrugator press and/or the flexographic printing press as a portion of the aqueous medium used in preparing the starch adhesive. In the process of the present invention, at least one of, but most advantageously both, the first portion of the aqueous medium, which is used to initially slurry the uncooked carrier starch, and the second portion of the aqueous medium, which is used to subsequently dilute the cooked starch liquor prior to the addition of additional raw starch, comprise a mixture of fresh water and recycled wash water selected from the group consisting essentially of untreated flexographic printing press wash water, untreated corrugator wash water, and mixtures thereof. Most advantageously, this mixture comprises about equal parts of fresh water and recycled wash water, with the recycled wash water most advantageously comprising a mixture of about equal parts of untreated flexographic printing press wash water and untreated corrugator wash water.

It is to be understood that the term "untreated" as used herein with respect to waste wash water means that the wash water has not been subjected to any type of flocculation, filtering or other treatment to remove paper lint, ink solids, or ammonium ions from the waste wash water. It has been found that use of flexographic press waste wash water, alone or in combination with corrugator press waste wash water, in the process of the present invention has little or no effect on the gelatinization temperature or gel characteristics of corn starch adhesives. Additionally, it has been found that any adverse effect that the use of flexographic press waste wash water may have on viscosity can be readily compensated for by small reductions in the amount of carrier starch in the adhesive formulation. In practice, an aqueous medium comprising about 50% untreated flexographic waste wash water and about 50% fresh water has been used successfully to prepare starch based adhesives in accordance with the present invention.

Referring again to the drawing, there is depicted schematically an equipment train and process flow diagram for carrying out the method of the present invention. The primary system components are the adhesive preparation tank 10 and its companion holding tank 20, a sodium hydroxide supply tank 40, a first starch feed bin 50, a second starch feed bin 60, a borating additive feed bin 70, a first waste wash water collection tank 80a, second waste wash water collection tank 80b, and a main make-up water supply tank 90. The first waste wash water collection tank 80a serves as a holding vessel for waste wash water from the periodic cleaning of the flexographic printing press 25, while the second waste wash water collection tank 80b serves as a holding vessel for waste wash water from the periodic cleaning of the corrugator 35.

To form the aqueous medium to be used in preparing the starch adhesive in accordance with the method of the present invention, valve 92 is opened to admit fresh water 3, typically tap water, into the main water tank 90, while valves 82a and 82b are opened and pumps 84a and 84b activated to transfer waste wash water 5 from collection tank 80a and waste wash water 7 from collection tank 80b to the main water tank 90. Preferably, the valves 82a, 82b and 92 are opened and closed so as to provide a mixture of water in the main water tank 90 which is about one-half fresh water and one-half recycled, i.e., waste wash water. By selectively controlling the valves 82a and 82b and their associated pumps 84a and 84b, the make-up of the recycled wash water supplied to tank 90 may be varied from 100% flexographic printing press wash water 5 to 100% corrugator wash water 7 or any combination therebetween, although the recycled wash water most typically comprises about equal parts of flexographic printing press wash water 5 and corrugator wash water 7.

The preparation of the adhesive in accordance with the method of the present invention is a batch-type process. To initiate the preparation of a batch of adhesive, water supply valve 32 is opened and pump 34 activated to transfer a controlled amount of mixed water 9 from the main supply tank 90 into the preparation tank 10. Most advantageously, the preparation tank 10 is mounted on weighing means such as load cells 110 for monitoring the weight of the tank 10 and its contents. The load cells 110 generate a signal indicative of the collective weight of the tank 10 and its contents and transmit that signal to a controller 120 which is in operative communication with water supply valve 32 and water supply pump 34. When a preselected desired amount of water 9 has been supplied to the preparation tank 10, as indicated by the increasing weight detected by the load cells, the controller 120 closes valve 32 and deactivates pump 34 to terminate the flow of mixed water 9 into the tank 10. As the make-up water 9 passes from the main supply tank 90 to the preparation tank 10, it traverses heat exchanger 96 wherein the make-up water 9 passes in heat exchange relationship with a heating medium 95, typically steam, to heat the make-up water 9 to a desired temperature, typically ranging from 100° F. to 105° F.

Provision is also made for fresh water 3 to be added directly to the preparation tank 10 in the event that the operator desires to use all fresh water or a water mix having a greater amount of fresh water than in the mixed water available from the main supply tank 90. In such a case, the operator may either manually open valve 98 or direct the controller 120 to open valve 98 to introduce fresh water 3 directly into the preparation tank 10 and again closes valve 98 to terminate the flow of fresh water 3 directly into the preparation tank 10. Any fresh water 3 supplied directly to the tank 10 would also generally be preheated to the desired temperature, typically ranging from 100° F. to 105° F.

Once the desired amount of water, typically about one-half of the total water in the adhesive formulation, has been introduced into the tank 10, the controller activates a rotary valve feeder 52 operatively associated with starch bin 50 to feed a first portion of starch 55 into the preparation tank 10 for admixing with the water therein. Again by monitoring the weight of the tank 10 and its contents, the controller 120 will sense when the desired amount of starch has been introduced into the tank 10 and thereupon deactivate the rotary valve feeder 52 thereby terminating the flow of starch into the tank 10 from the bin 50. The starch 55 in the bin 50 is typically a speciality starch such as modified corn starch rather than raw starch. In either case, the starch in bin 50 is most advantageously in a dry powder form.

After the correct amount of this first portion of starch 55 has been introduced into the tank 10, valve 42 is opened and pump 44 activated to meter sodium hydroxide into the preparation tank 10 from supply tank 40. The flow of sodium hydroxide 45 is carefully monitored by a mass flow meter 44 disposed in the supply line through which the sodium hydroxide 45 passes and operatively associated with the controller 120. Once the desired amount of sodium hydroxide is introduced into the tank 10, the controller 120 closes the valve 42 and deactivates pump 44 to terminate the flow of sodium hydroxide into the tank 10. Typically, the sodium hydroxide is supplied to the tank 10 as a 50% aqueous sodium hydroxide solution.

As the sodium hydroxide solution 45 is introduced into the preparation tank 10, the mixing means 30 is activated to promote thorough and efficient high shear vortex mixing of the sodium hydroxide with the starch and water in the tank 10. Thorough and efficient mixing is required as the sodium hydroxide serves to chemically cook the starch to form a cooked starch slurry, commonly referred to as the carrier portion of the adhesive formulation.

After the introduction of sodium hydroxide solution has ceased, the starch slurry is subjected to further high shear vortex mixing action via mixing means 30 for a period of about one minute before the introduction of borating additive 75 is initiated. To supply borating additive, typically borax or boric acid in dry powder form, to the preparation tank 10, a volumetric screw feeder 72 operatively associated with the bin 70 is activated by the controller 120 to controllably feed a predetermined amount of borating additive into the preparation tank 10. The mixing means 30 remains activated during the feeding of the borating additive into the tank 10 to ensure rapid mixing of the borating additive into the cooked starch slurry. As noted previously, the borating additive serves to stabilize the viscosity of the cooked starch slurry.

The mixing means 30 remains activated for a period of about 1½ minutes to continually subject the borated cooked starch slurry to a high shear vortex mixing action before a second portion of water is introduced into the tank 10 to dilute the borated cooked starch slurry prior to addition of the final ingredient of the adhesive formulation, which is additional starch, typically raw starch, from bin 60. To introduce this dilution water into the preparation tank 10, water supply valve 32 is again opened and pump 34 activated to transfer a controlled amount of mixed water 9 from the main supply tank 90 into the tank 10. Again the mixed water 9 is desirably preheated to a temperature, typically 100° F. to 105° F., before introduction into the tank 10. When the desired amount of dilution water has been added to the borated cooked starch slurry, the valve 32 is closed and the pump 34 deactivated to terminate the flow of mixed water 9 from the main water supply tank 90.

Upon termination of the flow of dilution water into the tank 10, the controller 120 activates the rotary valve feeder 62 operatively associated with the second starch bin 60 to feed a second portion of starch 65, typically raw corn starch, into the preparation tank 10 for admixing with the diluted, borated cooked starch slurry therein to yield the finished starch adhesive. Again by monitoring the weight of the tank 10 and its contents, the controller 120 will sense when the correct amount of additional starch 65 has been introduced into the tank 10 and thereupon deactivate the rotary valve feeder 62 thereby terminating the flow of starch into the tank 10 from the bin 60.

The mixing means 30 remains activated during the introduction of the dilution water and the second portion of starch to continually subject the contents of the tank 10 to a high shear vortex mixing action thereby ensuring rapid, efficient and thorough admixing of the ingredients. Once all the ingredients have been added, the starch slurry is continuously agitated for an additional period of time, typically from about 1½ to about 2 minutes, to ensure a uniform finished product. Upon completion of this final mixing step, the transfer pump 14 is activated to convey the finished starch adhesive into the holding tank 20 from which it is pumped on demand to the corrugator 35.

The method of preparing starch adhesives in accordance with the present invention may be advantageously carried out using an automated adhesive preparation system, most advantageously, the EXPOMATIC ® automatic adhesive preparation system marketed by ABB Sprout-Bauer, Inc. of Muncy, Pa. This system utilizes a microprocessor and a programmable logic controller operatively associated therewith as a means for controlling the overall process, i.e., as controller 120, thereby ensuring introduction of the various adhesive ingredients in precisely controlled amounts. The EXPOMATIC ® automatic adhesive preparation system also utilizes a high shear vortex mixing action to ensure that the ingredients are thoroughly and efficiently mixed.

The method of the present invention may be advantageously controlled by maintaining the viscosity of the finished starch adhesive between permissible upper and lower viscosity limits. It is well appreciated that viscosity of the adhesive controls the rate at which the adhesive is absorbed into the paper after its application and prior to gelatinization. The higher its viscosity, the more slowly the adhesive is absorbed. To ensure proper absorption and applicability, the viscosity should be maintained within desirable limits. Typically, the viscosity of the finished starch based adhesive should be maintained between a Stein-Hall viscosity of 20–25 seconds for low weight board and between a Stein-Hall viscosity of 40–72 seconds for heavy weight board.

Stein-Hall viscosity is an industry standard. A thorough explanation of the standard procedures for determining the Stein-Hall viscosity of a starch slurry is presented in the aforementioned 1977 TAPPI monograph entitled "Preparation of Corrugating Adhesives" at pages 47–50. As a reference point, the water at a temperature of 75° F. (23.9° C.) has a Stein-Hall viscosity of 15 seconds.

In practice of the present invention, a viscosity monitor 130, operatively associated with the storage tank 20, monitors the viscosity of the finished starch adhesive in the storage tank 20. The viscosity monitor 130 senses the viscosity of the finished starch adhesive and generates a signal indicative thereof which is transmitted to the controller 120 wherein the sensed viscosity signal is compared to an upper viscosity limit set point and a lower viscosity limit set point. The upper viscosity limit set point represents a preselected upper permissible viscosity for the finished starch adhesive based on its subsequent usage and the lower viscosity limit set point represents a preselected lower permissible viscosity for the finished starch adhesive based on its subsequent usage.

If the sensed viscosity moves out of the range of permissible viscosity defined between the preselected upper and lower set points, the controller 120 adjusts the formulation of the batch of starch adhesive it is then preparing to return the viscosity of the starch adhesive into the permissible range. For instance, if the sensed viscosity falls below the lower viscosity limit set point, the controller 120 responds by increasing the amount of starch introduced into the preparation tank 10. This may be accomplished by increasing either the first portion of starch or the second portion of starch added to the preparation tank 10 or both. Most advantageously, the additional starch is added in the first portion of starch which is used to produce the cooked carrier starch portion of the formulation.

On the other hand, if the sensed viscosity of the finished starch adhesive in storage tank 20 rises above the preselected upper viscosity limit set point, the controller 120 responds by increasing the amount of aqueous medium introduced into the preparation tank 10. This may be accomplished by increasing either the first portion of aqueous medium or the second portion of aqueous medium introduced into the preparation tank 10 or both. In either case, the amount of aqueous medium may be increased simply by introducing more mixed water 9 into the formulation or by introducing fresh water 3 directly into the preparation tank 10.

I claim:

1. A method of preparing a starch based adhesive comprising admixing a first portion of aqueous medium, a first starch portion, an aqueous sodium hydroxide solution, a borating additive, a second portion of aqueous medium and a second starch portion, at least one of said first and second portions of aqueous medium comprising a mixture of fresh water and recycled wash water, said recycled wash water selected from the group consisting essentially of untreated flexographic printing press wash water, untreated corrugator wash water, and mixtures thereof.

2. A method as recited in claim 1 wherein at least one of said first and second portions of aqueous medium comprises a mixture of about equal parts of fresh water and said recycled wash water.

3. A method as recited in claim 2 wherein said recycled wash water comprises untreated flexographic printing press wash water.

4. A method as recited in claim 2 wherein said recycled wash water comprises a mixture of about equal parts of untreated flexographic printing press wash water and untreated corrugator wash water.

5. A method of preparing a batch of starch based adhesive in a single preparation tank equipped with a high shear vortex mixing means, comprising:
   a. introducing a first portion of aqueous medium into the tank;
   b. introducing a first portion of starch into said aqueous medium in the tank;
   c. admixing an aqueous sodium hydroxide solution with the first portion of starch and said aqueous medium in the tank via high shear vortex mixing whereby the first portion of starch is chemically cooked;
   d. admixing a borating additive with the cooked starch liquor in the tank via high shear vortex mixing;

e. admixing a second portion of aqueous medium with the borated cooked starch liquor in the tank; and f. admixing a second portion of starch with the diluted borated cooked starch liquor in the tank via high shear vortex mixing to produce a finished starch based adhesive;

at least one of said first portion and second portion of aqueous medium comprising a mixture of fresh water and recycled wash water, said recycled wash water selected from the group consisting essentially of untreated flexographic printing press wash water, untreated corrugator wash water, and mixtures thereof.

6. A method as recited in claim 5 wherein at least one of said first and second portions of aqueous medium comprises a mixture of about equal parts of fresh water and said recycled wash water.

7. A method as recited in claim 6 wherein said recycled wash water comprises untreated flexographic printing press wash water.

8. A method as recited in claim 6 wherein said recycled wash water comprises a mixture of about equal parts of untreated flexographic printing press wash water and untreated corrugator wash water.

9. A method of preparing a starch based adhesive in a single preparation tank equipped with a high shear vortex mixing means, comprising:

a. introducing a first portion of aqueous medium into the tank;

b. introducing a first portion of starch into said aqueous medium in the tank;

c. admixing an aqueous sodium hydroxide solution with the first portion of starch and said aqueous medium in the tank via high shear vortex mixing whereby the first portion of starch is chemically cooked;

d. admixing a borating additive with the cooked starch liquor in the tank via high shear vortex mixing;

e. admixing a second portion of aqueous medium with the borated cooked starch liquor in the tank; and f. admixing a second portion of starch with the diluted borated cooked starch liquor in the tank via high shear vortex mixing to produce a finished starch based adhesive;

at least one of said first portion and second portion of aqueous medium comprising a mixture of fresh water and untreated flexographic printing press wash water.

* * * * *